United States Patent [19]

Maugendre et al.

[11] Patent Number: 5,346,864
[45] Date of Patent: Sep. 13, 1994

[54] PROCESS OF PRODUCTION OF A GLASS INTENDED TO BE TRANSFORMED INTO CONTINUOUS OR STABLE FIBERS

[75] Inventors: Stephane Maugendre, Chantilly; Bernard Dubois, Paris, both of France

[73] Assignee: Saint-Gobain Recherch, Aubervilliers, France

[21] Appl. No.: 13,677

[22] Filed: Feb. 3, 1993

Related U.S. Application Data

[63] Continuation of Ser. No. 583,419, Sep. 17, 1990, abandoned.

[30] Foreign Application Priority Data

Sep. 18, 1989 [FR] France ................................ 89 12169

[51] Int. Cl.$^5$ .............................................. C03C 13/00
[52] U.S. Cl. ........................................ 501/35; 501/59; 501/66; 501/70; 65/376
[58] Field of Search ....................... 501/35, 36, 38, 56, 501/70, 72, 59, 66; 65/2

[56] References Cited

U.S. PATENT DOCUMENTS

| | | | |
|---|---|---|---|
| Re. 25,312 | 5/1960 | Duncan et al. ...................... | 501/71 |
| 3,853,569 | 12/1974 | Laurent et al. ..................... | 501/35 |
| 3,929,497 | 12/1975 | Clark-Monks ..................... | 501/38 X |
| 4,138,235 | 2/1979 | Turaler ............................... | 65/27 |

FOREIGN PATENT DOCUMENTS

| | | |
|---|---|---|
| 887399 | 8/1953 | Fed. Rep. of Germany . |
| 3145822 | 12/1978 | Japan . |
| 3225552 | 9/1988 | Japan . |

OTHER PUBLICATIONS

"Hanley's Condensed Chemical Dictionary" by Irving Sax et al., p. 730.
"Introduction to Glass Science", Edited by L. D. Pye et al., pp. 415–416, 1972 (Published by Plenum Press).
"Technology for the Production of Glass", p. 282 (Published by Fu Wen Bookstore), no date.
Gomozova et al., *Metallurgical Waste in the Production of Smalt*, Glass and Ceramics J., vol. 46, Nos. 3/4, Mar.-/Apr. 1989, Plenum Publishing Corp., New York, N.Y.
Sax et al. Hawley Condensed Chemical Dictionary, 1987, pp. 863, 1066, 728, 206.

*Primary Examiner*—Karl Group
*Attorney, Agent, or Firm*—Pennie & Edmonds

[57] ABSTRACT

The invention provides a process which makes it possible to regulate the degree of oxidation-reduction of a glass during its production.

According to the invention, which relates to glasses intended to be transformed into continuous or staple fibers containing at most about 1% by weight of $Fe_2O_3$, the degree of oxidation of the glass is obtained by incorporating in the mixture of vitrifiable products at least two oxidizing agents, one of them being an inorganic nitrate, the other being, according to preference, an oxidized compound of manganese in which the oxidation state of the manganese is greater than 2, potassium dichromate and/or ceric oxide.

The invention particularly favors the recycling of waste from products with a glass fiber base in the vitrifiable mixture.

40 Claims, No Drawings

PROCESS OF PRODUCTION OF A GLASS INTENDED TO BE TRANSFORMED INTO CONTINUOUS OR STABLE FIBERS

This is a continuation of application Ser. No. 07/583,419, filed Sep. 17, 1992, now abandoned.

FIELD OF THE INVENTION

The invention relates to a process of production of a glass, obtained by melting of a mixture of vitrifiable materials, according to which its degree of oxidation-reduction is regulated at the desired level. The invention relates to glasses intended to be transformed into continuous fibers by mechanical drawing or into staple fibers by centrifuging and/or by drawing by a fluid.

BACKGROUND OF THE INVENTION

Glasses which are to be transformed into the form of fibers are produced from natural raw materials which contain various impurities, particularly iron oxide. When production conditions do not make it possible to obtain a sufficiently oxidized glass, serious drawbacks result. The ferrous iron/ferric iron ratio in the molten glass will increase and thereby cause a reduction of the conductivity of radiation of the glass. This reduction of the conductivity will be reflected by an increase in the difference in temperature between two given points in the molten glass bath. This phenomenon causes a change in the convection currents of the glass and will disturb the performance of the furnace, especially in the case of an electric furnace, which is more sensitive to the iron content than a draft furnace.

It is well known to introduce sodium sulfate, calcium sulfate or ammonium sulfate in the vitrifiable mixture, in order to facilitate melting of the mixture and aid in refining of the glass. When the glass is oxidized insufficiently, the dissolution capacity of the sulfates is lower. It follows that the melting rate of the mixture is slowed down, which can be compensated for only by an increase of the temperature in the melting zone. This requires an increase in the amount of energy used to melt the glass, and causes an accelerated wear of the refractories constituting the walls and the bottom of the furnace.

It is also necessary to emphasize that the reduction of the glass can cause its degassing. The excess of sulfate that it contains in the dissolved state is released in the form of $SO_2$, which gives rise to an insulating layer between the vitrifiable mixture and the molten glass. This phenomenon considerably impedes the melting.

It is also known that the fibers obtained from an insufficiently oxidized glass exhibit diminished mechanical properties. This is clearly shown in "The effect of batch carbon on the strength of E-glass fibers", Glass Technology, p. 90–91, vol. 10 no. 3 (June 1969), with regard to E glass, which is universally used to produce continuous fibers.

Maintaining a minimum degree of oxidation is therefore imperative to assure proper operation of the glass production devices and the production of high quality fibers.

To prevent the drawbacks described above, it is customary to use raw materials containing a minimum of impurities, especially iron. These materials are extracted often far from the factories which use them, which proportionately increases their cost. It is also customary to prevent excessive amounts of products able to reduce the glass from being introduced into the vitrifiable mixture; this precaution limits in particular the amount of production waste, formed, for example, by fibers coated with organic products, able to be recycled. Until now, the only economical way to recycle a large amount of waste has been to increase considerably the sulfate level in the vitrifiable mixture, but such a process is environmentally unsound due to the air pollution it causes.

SUMMARY OF THE INVENTION

It is an object of this invention to provide a process of production of a glass, intended for transformation into continuous or staple fibers, which regulates the degree of oxidation of said glass while preventing the drawbacks usually encountered in such a process.

It is a particular object of this invention to provide such a process which makes it possible to use vitrifiable raw materials less pure than those which are usually used in the glass fiber industry, without reducing the production capacity of the furnace or the quality of the glass produced, and while maintaining pollutant emissions within acceptable limits.

It is another object of this invention to provide such a process which makes it possible to melt a vitrifiable mixture formed by natural raw materials and waste products having a glass base, while maintaining the production capacity of the furnace and the quality of the glass produced. This recycled waste may consist of glass fibers as well as cullet obtained by grinding glass packaging or glazings.

These objects are achieved by the present invention, which employs vitrifiable products including both vitrifiable natural raw materials and waste with a glass fibre base or cullet from the grinding of glass packaging or glazings, to produce a glass containing iron in a content of 1% or less by weight of $Fe_2O_3$. A mixture of vitrifiable products is melted, and the degree of oxidation of the glass is regulated by incorporating in the mixture at least two oxidizing agents. A first of these agents is an inorganic nitrate, such as sodium nitrate, calcium nitrate, or ammonium nitrate. The second agent may be an oxidized compound of manganese which is in a state of oxidation greater than 2, potassium dichromate, and/or ceric oxide. The oxidized compound of manganese is generally a natural raw material preferably supplying $MnO_2$ or $Mn_2O_3$.

The oxidizing agents are employed to maintain the $FeO/Fe_2O_3$ weight ratio at a value equal to or less than about 0.4, and most preferably between about 0.2 and about 0.3.

Incorporation in the vitrifiable mixture of at least one of the first oxidizing agents, and at least one of the second oxidizing agents, results in an oxidation capacity clearly greater than that obtained by the means traditionally used in the production of glasses used by the glass fiber industries. These means consist in introducing one or more sulfates in the mixture as the above-mentioned document describes by way of example.

The oxidation capacity of the combination of oxidizing agents according to the present invention makes it possible to reduce considerably the sulfate level in the mixture, and even to eliminate it. The drawbacks linked to the presence of sulfates are therefore greatly reduced or even eliminated by the present invention.

DETAILED DESCRIPTION OF THE PREFERRED EMBODIMENTS

The combinations of oxidizing agents defined by the invention, which exhibit both an excellent oxidation capacity and the lowest cost, are formed by sodium nitrate and/or potassium nitrate and/or calcium nitrate and manganese dioxide.

It has been determined that the control of the degree of oxidation of the glass can be performed in a satisfactory manner by introducing to the vitrifiable mixture about 0.05 to about 6 parts by weight of oxidizing agents per 100 parts by weight of said mixture. The amount of oxidizing agents is most preferably between about 1 and about 3 parts by weight per 100 parts by weight of vitrifiable mixture.

According to the process of the invention, the nitrate content is generally between about 0.02 and about 3 parts by weight per 100 parts by weight of vitrifiable mixture. However, to reduce the amount of gas of formula $NO_x$ released during the melting and therefore to reduce the pollutant emissions, it is preferable to limit the nitrate content to about 1.5 parts by weight. Consequently, the total nitrate content is generally between about 0.5 part by weight and about 1.5 parts by weight.

The process according to the invention applies to various glasses which may be transformed into staple fibers according to known processes, such as centrifuging of molten glass contained in a rotary device provided with orifices on its periphery, or which may be transformed into continuous fibers by mechanical drawing of the molten glass.

EXAMPLES

The following examples are meant to illustrate the present invention, and should not be understood as limiting the invention in any way.

EXAMPLE 1

The process according to the invention can be used to obtain a glass whose chemical composition is defined by the following limits by weight: 61 to 72% $SiO_2$; 2 to 8% $Al_2O_3$; 5 to 10% CaO; 0 to 5% MgO; 13 to 17% $Na_2O$; 0 to 2% $K_2O$; 0 to 7% $B_2O_3$; 0 to 15% $F_2$; 0 to 2.5% BaO and less than 1% total iron expressed in the form of $Fe_2O_3$. The impurities supplied by the various vitrifiable materials and comprising other elements amount to less than 2% by weight in this example. Because of the addition of oxidizing agents according to the invention, the final glass may also contain up to 3% by weight of manganese oxide, chromium oxide and/or cerium oxide. This glass may be transformed into staple fibers.

EXAMPLE 2

The process according to the invention may be used to obtain a glass whose chemical composition is defined by the following limits by weight: 52 to 58% $SiO_2$; 12 to 16% $Al_2O_3$; 19 to 25% CaO and/or MgO; 4 to 8% $B_2O_3$; 0 to 1.5% $F_2$; less than 2% alkali metal oxides; and less than 1% total iron expressed in the form of $Fe_2O_3$. The impurities supplied by the vitrifiable materials and comprising other elements amount to less than 2%. As in the preceding example, the final glass may contain up to 3% by weight of manganese oxide, chromium oxide and/or cerium oxide. This glass may be transformed into continuous fibers.

In the case of glasses comprising very little alkaline oxides, it is preferable to use nitrates other than the alkaline nitrates for example, calcium nitrate.

EXAMPLE 3

The advantages of the invention will be better evaluated through the various results described below. The glass chosen to illustrate the invention is a glass used to produce staple fibers, whose chemical composition is basically defined according to the following limits by weight: 64% $SiO_2$; 3.3% $Al_2O_3$; 7% CaO; 2.9% MgO; 15.8% $Na_2O$; 1.4% $K_2O$; and 4.5% $B_2O_3$. These various percentages vary as a function of the iron content in the final glass and of the oxide content supplied by the oxidizing agents introduced in the mixture.

Table I shows the extent to which the introduction of waste causes reduction of the glass, for glasses produced in an electrical heating furnace. The more or less reduced state of the glass is evaluated through the measurement of the $FeO/Fe_2O_3$ ratio. These figures are for mixtures which do not contain the oxidizing agents recommended by the invention, and are intended as a reference. Glasses no. 1 to 8 exhibit a chemical composition very close to that indicated above in this Example 3. The operation of electric furnaces being very sensitive to iron content, and particularly FeO content, the glasses examined contain less than 0.15% of total iron, expressed in the form $Fe_2O_3$.

TABLE I

| Glass | No. 1 | No. 2 | No. 3 | No. 4 | No. 5 | No. 6 | No. 7 | No. 8 |
|---|---|---|---|---|---|---|---|---|
| Waste (%) | 0 | 1 | 2 | 3 | 4 | 5 | 7 | 10 |
| $FeO/Fe_2O_3$ | 0.56 | 0.60 | 0.63 | 0.64 | 0.65 | 0.69 | 0.68 | 0.74 |
| Total iron (in % of $Fe_2O_3$) | 0.12 | 0.12 | 0.12 | 0.09 | 0.10 | 0.10 | 0.10 | 0.10 |

Glasses no. 1 to 8 are produced from vitrifiable mixtures containing an increasing amount of glass fiber waste. This waste is formed from production residues ground and dried before being incorporated in the mixture. These mixtures do not contain sulfate deliberately added in the form of raw material, such as sodium sulfate. The glasses obtained can nevertheless contain a little $SO_3$ from the recycled waste, if the waste comes from glasses produced traditionally.

EXAMPLE 4

Table II exhibits the results obtained for glasses produced in the same manner, but shows the influence of the addition of a single oxidizing agent, a nitrate, in a mixture containing waste, on the oxidation-reduction state of the glass obtained.

TABLE II

| Glass | No. 6 | No. 9 | No. 10 | No. 11 | No. 12 | No. 13 |
|---|---|---|---|---|---|---|
| Waste (%) | 5 | 5 | 5 | 5 | 5 | 10 |
| $NaNO_3$ (%) | 0 | 0.2 | 0.4 | 0.8 | 1 | 1.5 |
| $FeO/Fe_2O_3$ | 0.69 | 0.67 | 0.65 | 0.63 | 0.60 | 0.59 |
| Total iron (by % of $Fe_2O_3$) | 0.10 | 0.10 | 0.10 | 0.10 | 0.10 | 0.10 |

The introduction of a gradually increasing nitrate content in the mixture makes it possible to reduce the $FeO/Fe_2O_3$ weight ratio only rather slowly. It is necessary to introduce at least 1.5% of $NaNO_3$ to neutralize the reducing effect caused by the presence of 10% of waste, as revealed by comparison of glasses no. 1 and 13.

The $FeO/Fe_2O_3$ weight ratio is clearly greater than 0.5 while it is equal to or less than about 0.3 for a glass produced from a standard mixture, with sulfate but without waste.

It is evident from these tests that the oxidation capacity of the nitrate is small.

EXAMPLE 5

Table III shows the results obtained on glasses produced in an electric furnace such as the preceding glasses. This series shows the influence of an oxidizing agent, such as $MnO_2$, on the degree of oxidation of the glass obtained.

TABLE III

| Glass | No. 14 | No. 15 | No. 16 | No. 17 | No. 18 |
| --- | --- | --- | --- | --- | --- |
| Waste (%) | 5 | 5 | 5 | 5 | 5 |
| $MnO_2$ (%) | 0 | 0.5 | 0.8 | 2 | 3 |
| $FeO/Fe_2O_3$ | 0.58 | 0.59 | 0.62 | 0.52 | 0.11 |
| Total iron (by % of $Fe_2O_3$) | 0.12 | 0.10 | 0.11 | 0.12 | 0.12 |

The series of glasses no. 14 to 18 teaches that $MnO_2$ has only little influence on the $FeO/Fe_2O_3$ ratio up to a content of at least 2%. Glass no. 18 shows that from 3%, $MnO_2$ has a marked effect, this observation being balanced by the fact that the amount of waste is only 5%.

Maintenance of the $FeO/Fe_2O_3$ weight ratio at a value less than 0.3 can be obtained by the action of $MnO_2$ alone if it is introduced into the mixture in a high enough percentage. This may not be feasible, however, due to the increased cost of the mixture, and possible variations in the properties of the glass produced.

EXAMPLE 6

According to the present invention, the joint action of at least two oxidizing agents, a first being broken down at a low temperature (nitrate), and a second ($Mn_xO_y$, $CeO_2$, $K_2Cr_2O_7$) being broken down at a temperature higher than the first, results in an unexpected oxidation capacity. It has been discovered that the oxidation capacity of a mixture of these two oxidizing agents is greater, with identical proportions, than that observed by using a single one of them. The following examples illustrate this fact.

Table IV corresponds to a series of glasses obtained from a vitrifiable mixture comprising a particularly impure sand melted in a furnace having a bottom provided with electrodes. In addition to $SiO_2$, the sand supplies in the glass relatively high contents of $Al_2O_3$, CaO and $Na_2O$, and a particularly large amount of iron. This explains the high total iron content of glasses no. 19 to 23.

TABLE IV

| Glass | No. 19 | No. 20 | No. 21 | No. 22 | No. 23 |
| --- | --- | --- | --- | --- | --- |
| $Na_2SO_4$ (%) | 0.4 | — | — | — | — |
| $MnO_2$ (%) | — | 0.5 | 0.8 | 0.8 | 1.5 |
| $NaNO_3$ (%) | — | 0.5 | 0.5 | 1 | 0.5 |
| $FeO/Fe_2O_3$ | 0.30 | 0.16 | 0.13 | 0.11 | 0.08 |
| Total iron (by % of $Fe_2O_3$) | 0.50 | 0.48 | 0.49 | 0.50 | 0.49 |

Glass no. 19 is produced from a mixture containing sodium sulfate and exhibits an $FeO/Fe_2O_3$ weight ratio normal for such a mixture. Based on the total iron content, the FeO level is on the order of 1500 ppm; consequently, the radiation conductivity of the glass greatly decreases, which is reflected by an increase of the temperature of the bottom and of the throat of the electric furnace.

Glasses no. 20 to 23 illustrate the invention. The $FeO/Fe_2O_3$ weight ratio immediately falls to very low values for a total content of oxidizing agents which does not exceed 2%. For glasses no. 22 and 23, the FeO level is on the order of 500 ppm and makes it possible to find bottom and throat temperatures usually measured in an electric furnace operating normally.

EXAMPLE 7

Table V illustrates the opportunities presented by the invention for recycling waste by maintaining correct operating conditions for the electric furnace. Glasses no. 14 and 8 are given as reference for mixtures respectively comprising 5 and 10% of waste. The various vitrifiable mixtures are made from raw materials typically used for the electrical melting, the molten glass not containing more than 0.15% of total iron.

TABLE V

| Glass | No. 14 | No. 24 | No. 25 | No. 8 | No. 26 | No. 27 | No. 28 | No. 29 |
| --- | --- | --- | --- | --- | --- | --- | --- | --- |
| Waste (%) | 5 | 5 | 5 | 10 | 10 | 10 | 10 | 10 |
| $MnO_2$ | — | 0.8 | 1 | — | 1 | 1 | 1 | 1.5 |
| $NaNO_3$ | — | 1 | 1 | — | 1 | 1.5 | 2 | 1.5 |
| $FeO/Fe_2O_3$ | 0.58 | 0.18 | 0.08 | 0.74 | 0.53 | 0.44 | 0.47 | 0.15 |
| Total iron (in of $Fe_2O_3$) | 0.12 | 0.12 | *I822* 0.12 | 0.10 | 0.12 | 0.12 | 0.12 | 0.12 |

The comparison of glasses no. 24, 25, and 26 to 29 with those appearing in tables II and III shows the advantage of the invention relative to the mixtures comprising only a single oxidizing agent. The $FeO/Fe_2O_3$ weight ratio obtained with 3% $MnO_2$ and 5% of waste (glass no. 18), compared with that obtained also with 3% of oxidizing agents but two times more waste (glass no. 29), is indicative of the oxidation capacities offered by the invention.

By the use of the present invention, it is possible to introduce in the vitrifiable mixture up to 20% by weight of waste formed by products with a glass fiber base, to obtain a glass having a degree of oxidation-reduction which comports with normal operation of the melting furnaces, and to maintain the quality of the fibers ultimately produced.

In the area of glasses intended to be transformed into staple fibers, it is possible, according to this invention, to produce a vitrifiable mixture composed of natural raw materials and glass waste, the chemical composition of the latter being different from that of the glass which will result from the melting of the mixture. Thus, the recycled glass can come from continuous fiber production waste, even from cullet obtained by grinding bottles or glazings. The composition of the mixture of the natural raw materials consequently will be quite obviously calculated. In the case of cullet from bottles or glazings, it is even possible to recycle glasses whose FeO/Fe$_2$O$_3$ weight ratio is greater than 0.4.

A glass, whose composition corresponds to that of the glass in Example 3 above, has been obtained from a mixture comprising 59.4% of a cullet from bottles whose average composition is the following: 71.15% SiO$_2$; 2.00% Al$_2$O$_3$; 12.90% Na$_2$O; 0.70% K$_2$O; 10.10% CaO; 1.80% MgO; 0.34% Fe$_2$O$_3$; 0.23% SO$_3$; 0.33% B$_2$O$_3$.

The FeO/Fe$_2$O$_3$ weight ratio of the glass obtained has been maintained at a value less than 0.3 due to the presence in the mixture of 0.4% of MnO$_2$ and 0.3% of NaNO$_3$, as taught by the present invention.

All the glasses cited by way of examples have been produced from mixtures without sulfate deliberately added as raw material. It is quite obvious that it is possible to add this compound in the framework of the process according to the invention, subject to the maintenance of pollutant emissions within acceptable limits.

What is claimed is:

1. A process for the production of glass for use in forming glass fibers, said process comprising:
   melting a mixture of vitrifiable products to produce a molten glass containing iron oxides in an amount of about 1 weight % or less; and
   incorporating in said mixture at least two oxidizing agents, wherein a first of said oxidizing agents is calcium nitrate, and a second of said oxidizing agents is at least one agent selected from the group consisting of an oxidized compound of manganese in which said manganese is in a state of oxidation greater than 2 and potassium dichromate to regulate the degree of oxidation of the molten glass produced from said mixture.

2. The process of claim 1, which further comprises selecting said oxidizing agents to maintain the weight ratio of FeO to Fe$_2$O$_3$ in the molten glass at a value equal to or less than 0.4.

3. The process of claim 2, which further comprises selecting said oxidizing agents to maintain the weight ratio of FeO to Fe$_2$O$_3$ between about 0.2 and about 0.3.

4. The process of claim 1, which further comprises selecting said first oxidizing agent as calcium nitrate and said second oxidizing agent as manganese dioxide.

5. The process of claim 1, which further comprises selecting said first oxidizing agent as a combination of sodium nitrate and calcium nitrate, and said second oxidizing agent as manganese dioxide.

6. The process of claim 1, which further comprises incorporating from about 0.05 to about 6 parts by weight of oxidizing agents per 100 parts by weight of mixture.

7. The process of claim 6, which further comprises incorporating from about 1 to about 3 parts by weight of oxidizing agents per 100 parts by weight of mixture.

8. The process of claim 1, which further comprises incorporating from about 0.02 to about 3 parts by weight nitrate content per 100 parts by weight of mixture.

9. The process of claim 8, which further comprises incorporating from about 0.5 to about 1.5 parts by weight nitrate content per 100 parts by weight of mixture.

10. The process of claim 1, which further comprises forming the vitrifiable mixture to be free of compounds containing more than 90% by weight of a sulfate.

11. The process of claim 1, which further comprises introducing vitrifiable products and said oxidizing agents in amounts calculated to obtain a glass having a chemical composition by weight defined by the following limits: 61 to 72% SiO$_2$; 2 to 8% Al$_2$O$_3$; 5 to 10% CaO; 0 to 5% MgO; 13 to 17% Na$_2$O; 0 to 2% K$_2$O; 0 to 7% B$_2$O$_3$; 0 to 1.5% F$_2$; 0 to 2.5% BaO; about 1% or less Fe$_2$O$_3$; and 0 to 2% impurities; and wherein said glass may contain additional compounds produced by said oxidizing agents.

12. The process of claim 11, which further comprises introducing said oxidizing agents in an amount calculated to obtain a glass having a content by weight of said at least one second oxidizing agent less than or equal to about 3%.

13. The process of claim 11, which further comprises selecting said vitrifiable products as vitrifiable natural raw materials and cullet resulting from the grinding of glass packaging and/or glazings.

14. The process of claim 11, which further comprises selecting said vitrifiable products as vitrifiable natural raw materials and glass fibers coming from production waste.

15. The process of claim 1, which further comprises introducing said vitrifiable products and said oxidizing agents in amounts calculated to obtain a glass having a chemical composition by weight defined by the following limits: 52 to 58% SiO$_2$; 12 to 16% Al$_2$O$_3$; 19 to 25% CaO and/or MgO; 4 to 8% B$_2$O$_3$; 0 to 1.5% F$_2$; 0 to 2% alkali metal oxide; about 1% or less Fe$_2$O$_3$; and 0 to 2% impurities; and wherein said glass may contain additional compounds produced by said oxidizing agents.

16. The process of claim 15, which further comprises selecting said vitrifiable products as vitrifiable natural raw materials and glass fibers coming from production waste.

17. A process for the production of glass for use in forming glass fibers, said glass containing Fe$_2$O$_3$ in an amount of 1 weight % or less by weight, said process comprising:
   melting a mixture of vitrifiable products to produce a molten glass; and
   incorporating in said mixture at least two oxidizing agents wherein a first oxidizing agent comprises calcium nitrate, and a second oxidizing agent comprising a natural raw material that supplies MnO$_2$ or Mn$_2$O$_3$ to regulate the degree of oxidation of the molten glass produced from said mixture; and
   selecting said oxidizing agents to maintain the ratio of FeO to Fe$_2$O$_3$ in the molten glass at a value equal to or less than a weight ratio of 0.4.

18. The process of claim 17, further comprising incorporating into said mixture from about 0.02 to about 3 parts by weight of said calcium nitrate per 100 parts of said mixture.

19. A mixture for producing glass fibers, comprising:
   vitrifiable products;
   a first oxidizing agent comprising calcium nitrate; and
   a second oxidizing agent comprising at least one agent selected from the group consisting of an oxidized compound of manganese in which said manganese is in a state of oxidation greater than two and potassium dichromate for regulating the degree of oxidation of the molten glass.

20. The mixture of claim 19, wherein said mixture contains about 1 weight % or less $Fe_2O_3$.

21. The mixture of claim 20, wherein the weight ratio in said mixture of FeO to $Fe_2O_3$ is equal to or less than about 0.4.

22. The mixture of claim 21, wherein the weight ratio of FeO to $Fe_2O_3$ is between about 0.2 and 0.3.

23. The mixture of claim 19, wherein said first oxidizing agent is calcium nitrate and said second oxidizing agent is manganese dioxide.

24. The mixture of claim 19, wherein said first oxidizing agent is a combination of sodium nitrate and calcium nitrate and said second oxidizing agent is manganese dioxide.

25. The mixture of claim 19, wherein said mixture comprises from about 0.05 to about 6 parts by weight of oxidizing agents per 100 parts of said mixture.

26. The mixture of claim 25, wherein said mixture comprises from about 1 to about 3 parts by weight of oxidizing agents per 100 parts of said mixture.

27. The mixture of claim 19, wherein said mixture comprises from about 0.02 to about 3 parts by weight of said calcium nitrate per 100 parts of said mixture.

28. The mixture of claim 27, wherein said mixture comprises from about 0.5 to about 1.5 parts by weight of said calcium nitrate per 100 parts of said mixture.

29. The mixture of claim 19, wherein said mixture is free of compounds containing more than 90% by weight of a sulfate.

30. A process for providing a glass comprising: melting a mixture of vitrifiable products to produce a molten glass containing $Fe_2O_3$ in an amount of about 1 weight % or less; and
   incorporating in said mixture at least three oxidizing agents comprising calcium nitrate and a mixture of potassium dichromate and ceric oxide, said oxidizing agents maintaining $FeO/Fe_2O_3$ at a weight ratio equal to or less than about 0.4.

31. The process of claim 30 wherein the oxidizing agents are selected to maintain the value of the $FeO/Fe_2O_3$ weight ratio between about 0.2 and about 0.3.

32. The process of claim 30 wherein the calcium nitrate is combined with sodium nitrate.

33. The process of claim 30 wherein the oxidizing agents comprise from about 0.05 to 6 weight percent based on the total weight of the vitrifiable mixture.

34. The process of to claim 33 wherein the calcium nitrate comprises from about 0.02 to 3 weight percent of the total weight of the vitrifiable mixture.

35. The process of claim 34 wherein the calcium nitrate comprises from about 0.5 to 1.5 weight percent of the vitrifiable mixture.

36. The process according to claim 30 wherein the oxidizing agents and vitrifiable products are introduced in amounts calculated to obtain a glass whose chemical composition by weight is defined by the following limits: $SiO_2$: 61 to 72%, $Al_2O_3$: 2 to 8%, CaO: 5 to 10%, MgO: 0 to 5%, $Na_2O$: 13 to 17%, $K_2O$: 0 to 2%, $B_2O_3$: 0 to 7%, $F_2$: 0 to 1.5%, BaO: 0 to 2.5%, $Fe_2O_3$: less than 1%, impurities less than 2%, said glass additionally including chromic oxide and cerium oxide oxidation products from said second oxidizing agent.

37. The process according to claim 36 wherein the oxidizing agents are introduced into the mixture of vitrifiable components in an amount calculated to obtain a glass whose content of chromic oxide and cerium oxide is no greater than 3 weight percent based on the total weight of the glass composition.

38. The process according to claim 30 wherein the oxidizing agents and vitrifiable products are introduced in amounts calculated to obtain a glass whose chemical composition by weight is defined by the following limits: $SiO_2$: 52 to 58%, $Al_2O_3$: 12 to 16%, CaO and optionally MgO: 19 to 25%, $B_2O_3$: 4 to 8%, $F_2$: 0 to 1.5%, alkali metal oxide less than 2%, $Fe_2O_3$: less than 1%, impurities less than 2%; said glass additionally including chromic oxide and cerium oxide oxidation products from said second oxidizing agent.

39. The process of claim 1 wherein said first and said second oxidizing agents volatilize at different temperatures.

40. The process of claim 1 wherein the molten glass further comprises $SO_3$.

* * * * *